(12) United States Patent
Batra et al.

(10) Patent No.: US 8,452,853 B2
(45) Date of Patent: May 28, 2013

(54) BROWSER WITH OFFLINE WEB-APPLICATION ARCHITECTURE

(75) Inventors: Nikhil Kumar Batra, Houston, TX (US); Yasmary Hernandez, Miami, FL (US); Nathan Shlomo Marz, San Diego, CA (US); Robert Ross Peterson, Austin, TX (US); Lee Parnell Thompson, Cedar City, UT (US)

(73) Assignee: International Business Machines Corporation, Armonk, NY (US)

( * ) Notice: Subject to any disclaimer, the term of this patent is extended or adjusted under 35 U.S.C. 154(b) by 1415 days.

(21) Appl. No.: 11/682,101

(22) Filed: Mar. 5, 2007

(65) Prior Publication Data
US 2008/0222628 A1 Sep. 11, 2008

(51) Int. Cl.
*G06F 15/16* (2006.01)
*G06F 9/44* (2006.01)

(52) U.S. Cl.
USPC ................ 709/219; 709/203; 717/171

(58) Field of Classification Search
USPC .................... 709/203, 219; 717/171
See application file for complete search history.

(56) References Cited

U.S. PATENT DOCUMENTS

| | | | |
|---|---|---|---|
| 6,536,404 B2 | 3/2003 | Liu et al. | |
| 7,143,214 B2 | 11/2006 | Hayes et al. | |
| 7,379,986 B2 | 5/2008 | Kikinis | |
| 7,594,003 B2 * | 9/2009 | Davidson et al. | 709/219 |
| 7,600,048 B2 * | 10/2009 | Guest | 709/250 |
| 2003/0115167 A1 | 6/2003 | Sharif et al. | |
| 2004/0003031 A1 * | 1/2004 | Brown et al. | 709/203 |
| 2004/0201604 A1 | 10/2004 | Kraenzel et al. | |
| 2005/0188051 A1 | 8/2005 | Sneh | |
| 2007/0033569 A1 | 2/2007 | Davidson et al. | |
| 2007/0204057 A1 * | 8/2007 | Shaver et al. | 709/231 |
| 2008/0104195 A1 * | 5/2008 | Hawkins et al. | 709/217 |

FOREIGN PATENT DOCUMENTS

| | | |
|---|---|---|
| KR | 1020040066056 | 2/2006 |
| WO | 2005062848 A2 | 7/2005 |

OTHER PUBLICATIONS

Katz, "CouchDb, PHP and the offline Web", Internet Article, Oct. 8, 2006, pp. 1-4, http://damienkatz.net/2006/10/couchdb_and_php.html.

Yung et al., "Public Key Cryptography—PKC 2006", Proceedings of 9th International Conference on Theory and Practice of Public-Key Cryptography, New York, Apr. 2006,pp. 58-74.

(Continued)

*Primary Examiner* — Ranodhi Serrao
(74) *Attorney, Agent, or Firm* — Yee & Associates, P.C.

(57) ABSTRACT

A computer implemented method, apparatus, and computer program product for a computer implemented method, apparatus, and computer usable program code for providing an offline version of an online application. In one embodiment, the process initiates an online application on a connected client device using a specific operating environment associated with the online application. In response to detecting the online application going to an offline status, a determination is made as to whether a native application on the client device is present that is supportive of the online application. In response to a determination that the native application is present, the native application is executed using the specific operating environment associated with the online application. The specific operating environment associated with the online application on a server is transferred to an environment associated with the native application on the client.

14 Claims, 6 Drawing Sheets

OTHER PUBLICATIONS

Goteborg, "The Browser as Operating System", Nov. 30, 2005, 1 page, accessed Nov. 17, 2011, http://josefsblog.blogspot.com/search?updated-min=2005-01-01T00%3A00%3A00%2B01%3A00&updated-max=2006-01-01T00%3A00%3A00%2B01%3A00&max-results=50.

Schmeiser, "Make the Web your Operating System", Sep. 4, 2000, 3 pp., accessed Nov. 17, 2011, http://transcripts.cnn.com/2000/TECH/computing/09/04/seybold.webware.idg/index.html.

"VMWare Browser Appliance to Safeguard from Spyware", VMWare, 2011, 1 page, accessed Nov. 17, 2011, http://www.vmware.com/appliances/directory/80.

Simeonov et al., "@INGate: A Distributed Intelligent Network Approach to Bridge Switching and Packet Networks", Sixth International Conference on Computer Communications and Networks, Sep. 1997, pp. 358-363.

Simeonov et al., "On Using Nomadic Services for Distributed Intelligence", Microprocessors and Microsystems, vol. 24, No. 6, pp. 291-297, Oct. 1999.

* cited by examiner

BROWSER WITH OFFLINE WEB-APPLICATION ARCHITECTURE

BACKGROUND OF THE INVENTION

1. Field of the Invention

The present invention relates generally to a data processing system and in particular to a method and apparatus for web applications. Still more particularly, the present invention is directed to a computer implemented method, apparatus, and computer usable program code for providing an updateable offline version of a web-application.

2. Description of the Related Art

A web server is a computing device connected to a network that serves web content to users. Web content may include web pages and applications. An application server is a server that is wholly or partially dedicated to running one or more applications. A user on a remote client device may execute an application on a web server and/or an application server by connecting to the network on which the server is located and requesting execution of the application.

An application is computer software that uses the resources of a computing device to perform a task or service for a user. When an application located on a server, such as a web server or an application server, is accessible to a user located on a remote client device by connecting to the server via a network connection, the application may be referred to as an online application.

A user cannot execute or access an online application in the absence of a connection to a network on which the server is located. In addition, if the connection to the network between the client device and server device fails before execution of the application is complete, the user will be unable to continue using the online application until the network connection is re-established. In addition, even after the network connection is re-established, any results obtained during execution of the online application prior to loss of the network connection may be lost if the results data was not properly saved or backed up to data storage location accessible to the user.

In other words, currently available web browsers and servers do not permit a user to continue execution of an online application after a network connection to the server hosting the online application is lost. Thus, the loss of a network connection during execution of an online application may result in lost time, lost work and data, as well as inconvenience and frustration for users who must wait for the network connection to be re-established before any task associated with the online application can continue.

SUMMARY OF THE INVENTION

The illustrative embodiments provide a computer implemented method, apparatus, and computer usable program code for providing an offline version of an online application. In one embodiment, the process initiates an online application on a connected client device using a specific operating environment associated with the online application. In response to detecting the online application going to an offline status, a determination is made as to whether a native application on the client device is present that is supportive of the online application. In response to a determination that the native application is present, the native application is executed using the specific operating environment associated with the online application. The specific operating environment is transferred from the operating environment associated with the online application on a server to an environment associated with the native application on the client.

In response to restoring an online status, the native application is terminated and the specific operating environment associated with the native application is transferred to the specific operating environment associated with the online application. In one embodiment, the offline application is one of a word processor, a game, an application, a drawing program, an editing program, and a media player. The specific operating environment may include user data.

In another illustrative embodiment, a computer implemented method, apparatus, and computer usable program code is provided for providing an offline version of a corresponding online application. A client computing device initiates an online application to perform a task. In response to detecting the online application going to an offline status, an offline application associated with the client computing device that is supportive of the online application is identified. The offline application on the client computing device is executed to perform at least a portion of the task.

In another illustrative embodiment, an online application may be initiated by a client computing device to perform a task. In response to detecting the online application going to an offline status, an offline application associated with the client computing device that is supportive of the online application is identified. The offline application is executed on the client computing device to perform at least a portion of the task.

The online application may be executed in a runtime environment on a server. The offline application is executed in a runtime environment associated with a web browser on the client computing device. The offline application is a browser plug-in that executes in the absence of a network connection. An offline status may indicate a failure in a network connection, a server running the online application has become unresponsive, or the online application has terminated unexpectedly.

In response to restoring an online status, the online application is synchronized with data from the offline application and the offline application is terminated. Data in an offline application file format may be converted into an online application file format for synchronization of data in the online application with the offline application. Likewise, data in an online application file format may be converted into an offline application file format for synchronization of data in the offline application with the online application.

In another embodiment, memory space on the client computing device may be allocated to the online application, wherein the offline application is stored in the memory space. The offline application is automatically updated in the allocated memory space without requiring prior approval from a user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 9 is a flowchart illustrating a process for providing a dedicated memory space for an offline application in accordance with an illustrative embodiment.

DETAILED DESCRIPTION OF THE PREFERRED EMBODIMENT

Figure 1:
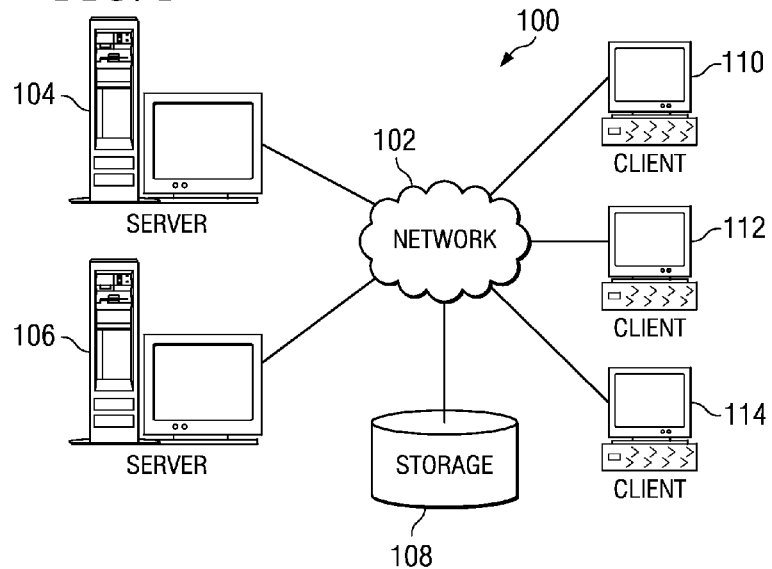
FIG. 1 is a pictorial representation of a network of data processing systems in which illustrative embodiments may be implemented.
Figure 2:
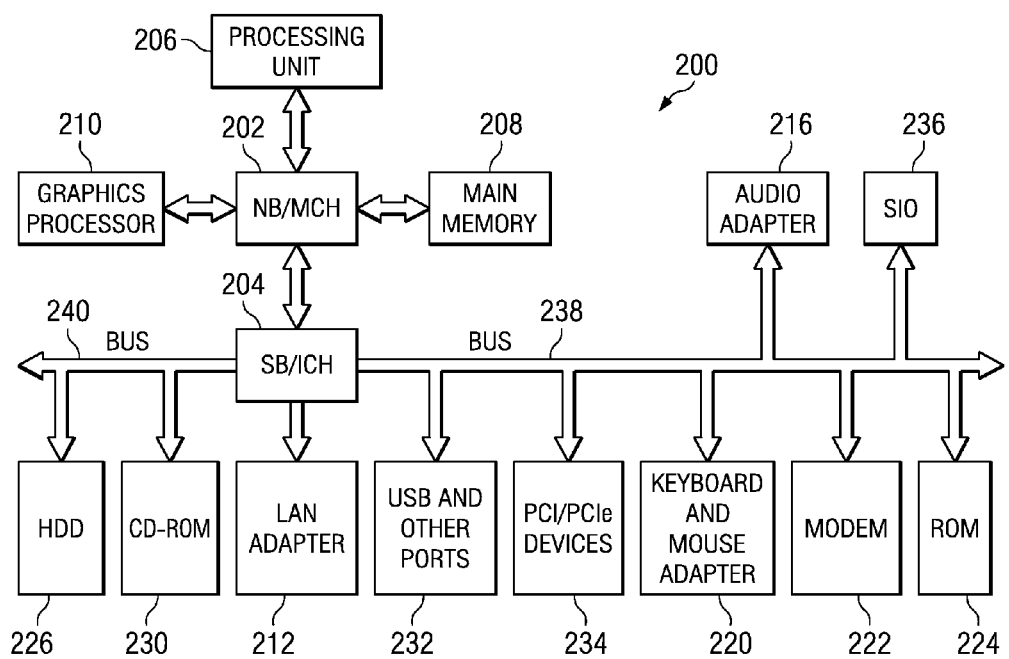
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. Server 104 and 106 may be any type of known or available server, including but not limited to, a web server, a web services server, an application server, or any other type of server. In this example, server 104 and 106 are web servers hosting online applications.

In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Clients 110, 112, and 114 request to access and/or execute one or more web-applications available on servers 104 and 106. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments recognize that with the popularity of web 2.0 applications that bring the desktop application experience to a browser, the browser is quickly becoming the platform of the future. A web 2.0 application is a second generation application that provides or facilitates collaborative Internet based services. Web 2.0 applications can include wikis, social networking sites, and communication tools that emphasize online sharing by multiple users. Examples of web 2.0 applications include Google® Maps, Wikipedia®, YouTube®, and the Windows® Live website.

However, the illustrative embodiments also recognize that a key problem encountered when using a web browser as a platform to run online applications is failover and the loss of network connectivity during execution of online applications. Failover refers to the ability to switch over to a redundant system when a previously active system fails.

The illustrative embodiments also recognize that browsers need to be extended to store key information and provide offline capabilities when a connection to a rich web-application is unexpectedly severed. Therefore, the illustrative embodiments provide a computer implemented method, apparatus, and computer usable program code for providing an offline version of an online application. In one embodiment, the process initiates an online application on a connected client device.

A connected client device is a client connected to a server via a network connection. A network connection may be implemented using connections, such as wire, wireless communication links, or fiber optic cables to connect a client to a server. For example, client 110 may be connected to server 104 via network 102 in FIG. 1. A connected client may use any known or available methods for connecting to another computing device on a network, including but not limited to, Transmission Control Protocol/Internet Protocol (TCP/IP) suite of protocols, Web Services Definition Language (WSDL), Hypertext Transfer Protocol (HTTP), or any other standards or protocols to communicate over a network connection. In one example, a connected client is a client that has initiated a session with a server over a network.

In this example, the process initiates an online application on a connected client device using a specific operating environment. An operating environment includes all of the resources needed to execute a particular application. An operating environment includes the software platform under which the application runs, the data input required by the application, the data outputs generated by the application, any additional programs, applications, or algorithms required to complete execution of the application, network connections, and/or any other hardware and/or software component required to execute the particular application.

The operating environment may be an operating environment associated with a server computer hosting and executing an online application. In this case, the operating environment is an online operating environment. An online operating environment is an operating environment that includes a network connection between the client device and the server. In another example, the operating environment may be an operating environment associated with a web browser on a client computer. An operating environment on a client device may be an online operating environment or an offline operating environment in which a network connection between the client device and the server is not available.

In response to detecting the online application going to an offline status, a native application on the client device is identified that is supportive of the online application. A native application is an application associated with a particular computing device. In this example, the native application is an application associated with the client device that initiated the online application.

An application that is supportive of an online application is an application that includes at least one of a set of functions associated with the online application. In other words, an online application may include multiple levels or sets of functions that perform one or more tasks in the operating environment on a server. The native application that is supportive of the online application is an application associated with the client device that includes one or more levels, sets, or subsets of functions included in the online application.

For example, an online application that is an account management application may include a set of functions for paying bills online, a set of functions for updating banking statements by connecting to a computer system associated with a user's bank, a set of functions for balancing an electronic checkbook based on user inputs, a set of functions for graphing past expenditures and predicting future expenditures, or any other account management functions In this example, the native application may include the set of functions for balancing an electronic checkbook based on user inputs, a set of functions for graphing past expenditures and predicting future expenditures. Thus, if the online application goes to an offline status such that the online application is no longer available to the user, the user can utilize the native application supportive of the online account management application to perform one or more functions in the set of functions for balancing an electronic checkbook based on user inputs and/or the set of functions for graphing past expenditures and predicting future expenditures.

In this manner, if the online application goes offline and/or the operating environment on the server for executing the online application is no longer available, the client device can continue executing a level, set, or subset of functions of the online application that are available in the native application located on the client device. Thus, the client can execute the native application to perform one or more functions associated with the online application in the offline operating environment of the client device.

The native application is executed using the specific environment of the online application. The specific application environment is transferred from the online application to the native application.

In another illustrative embodiment, an online application is initiated by a client computing device to perform a task. In response to detecting the online application going to an offline status, an offline application associated with the client computing device that is supportive of the online application is identified. The offline application is executed on the client computing device to perform at least a portion of the task.

The online application may be executed in a runtime environment on a server. The offline application is executed in a runtime environment associated with a web browser on the client computing device. The offline application is a browser plug-in that executes in the absence of a network connection. An offline status is a state of a computing device in which a connection to a network and/or a connection to a particular server or website is lost or cannot be established. An offline status may indicate a failure in a network connection, a server running the online application has become unresponsive, or an application has crashed.

The illustrative embodiments also provide a computer implemented method, apparatus, and computer usable program code for providing an offline version of a corresponding online application. A client computing device initiates an online application to perform a task. In response to detecting the online application going to an offline status, an offline application associated with the client computing device that is supportive of the online application is identified. The offline application on the client computing device is executed to perform at least a portion of the task.

Figure 3:
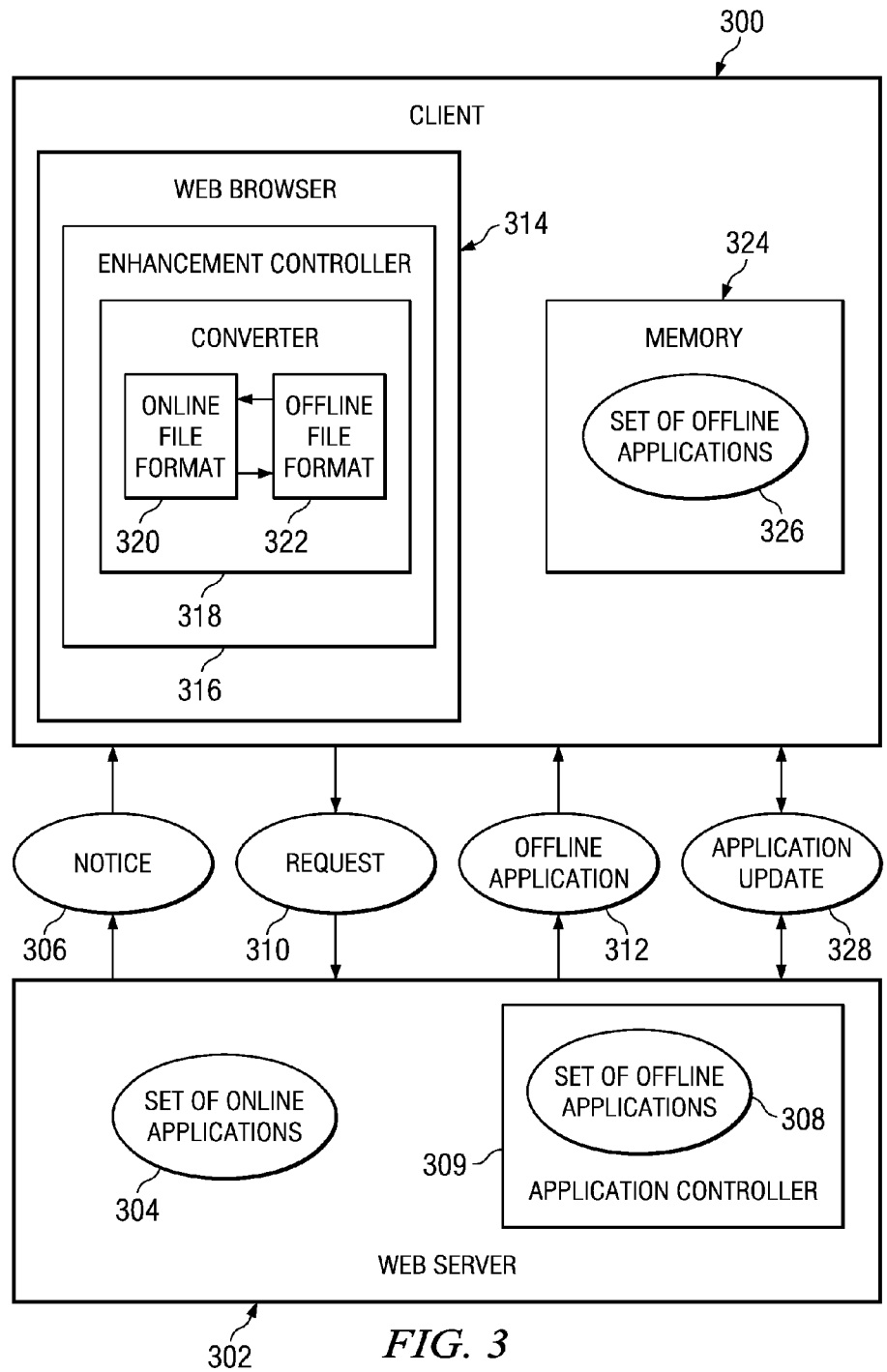
FIG. 3 is a block diagram illustrating a dataflow when a client utilizes an updateable offline version of an online web-application provided by a server in accordance with an illustrative embodiment.

FIG. 3 is a block diagram illustrating a dataflow when a client utilizes an updateable offline version of an online web-application provided by a server in accordance with an illustrative embodiment. Client 300 is implemented in any type of general computing device that supports a browser and has some local memory. In this example, client 300 is a client computing device, such as client 110 in FIG. 1.

Web server 302 is a server that provides set of online applications 304 for utilization by users. Web server 302 is any type of server, such as server 104 in FIG. 1. In other words, web server 302 may include processes for serving web pages, hosting online applications, executing applications, providing web services and/or any other type of processes associated with a server. For example, web server 302 may include any known or available software processes and components for managing applications (not shown), including but not limited to, components for receiving requests, executing applications, sending an application to a client, initiating a session between web server 302 and client 300, authenticating client 300, and/or any other processes performable by a server. Server 302 may be a hardware server, a software server, or a server having a combination of hardware and software components.

Web server 302 can be a server on a network, such as network 102 described in FIG. 1. Client 300 accesses web applications on server 302 through a network connection via a network device (not shown). The network device may be any type of network access software for allowing client 300 to access a network, such as the Internet. The network device connects to a network connection, such as network 102 in FIG. 1. The network connection permits access to any type of network, such as a local area network (LAN), a wide area network (WAN), an intranet, an Ethernet, or the Internet. In this example, client 300 connects to web server 302 via an Internet connection.

A user may access an online application in set of online applications on web server 302 by using client 300 connected to a network. As used herein, set of online applications refers to a set of one or more online applications. Set of online applications 304 is a set of one or more online applications. An online application is an application located on a computing device located remotely to a client requesting access to the application. The online application is accessible to the client by connecting to a network, such as the Internet. In other words, an online application is an application that is executed on a server located remotely to a client accessing and/or executing the application.

Online applications may include any type of application available to a user over a network. For example, an online application may include a spreadsheet application, a word processor, a drawing program, an editing program, a financial application, a stock trade application, a media player application, and/or any other type of application.

In this example, set of online applications 304 is a set of web 2.0 applications. However, set of online applications 304 may also include applications that are not considered web 2.0 applications. In other words, the illustrative embodiments are not limited to providing offline versions of web 2.0 applications. The illustrative embodiments may be implemented to provide offline versions of any type of application provided over a network.

When client 300 requests access to an online application in set of online applications 304 on web server 302, web server 302 sends notice 306 to client 300 notifying client 300 that an offline version of the requested online application is available. An offline application is an application that is located locally to a client computing device that is accessing and/or executing the application. An offline application is executed in a runtime environment that is local to the client. The offline application is available to the client in the absence of a network connection.

Set of offline applications 308 is a set of one or more offline versions of online applications available in set of online applications 304. An offline application may be a template of an online application capable of executing on a client browser. As used herein, set of offline applications 308 is a set of one or more native applications associated with client 300. Set of offline applications 308 is managed by application controller 309.

Application controller 309 is a software component for generating, providing, and/or updating one or more offline versions of online applications. Application controller 309 sends notice 306 to client 300 to inform client 300 that one or more offline versions of an online application requested by client 300 is available.

In response to receiving notice 306 informing client 300 that an offline version of a requested online application is available, client 300 may send request 310 to web server 302. Request 310 is a request to download and/or install an offline version of a given online application.

In response to receiving request 310 for an offline version of an online application, application controller 309 sends offline application 312 to client 300. Offline application 312 may be a template of an online application. Offline application 312 is received by web browser 314.

Web browser 314 is software that enables client to display and interact with applications and content associated with web pages. When client 300 is powered on, web browser 314 is available for use immediately. Web browser 314 includes enhancement controller 316. Enhancement controller 316 is a plug-in or add-on to web browser 314. Enhancement controller 316 enables web browser 314 to execute offline application 312 in a runtime environment located on client 300. In other words, enhancement controller 316 enables web browser 314 to behave like a platform for offline application 312 and play the role of an operating system.

Enhancement controller 316 includes converter 318. When a user switches from executing an online application to running an offline version of the application, a user may wish to update the offline version with current data from the online version. Converter 318 is a software component for converting application data in online file format 320 to offline file format 322.

Likewise, if a user wants to update an online application with data from an offline version of the application, the data from the offline version may need to be converted to an offline file format. Converter 318 can convert data in offline file format 322 to online file format 320.

Application update 328 is application data for updating an online version of the application with data from an offline version of the application. In this example, application update 328 is application data for updating an offline version of the application with data from the online version of the application. However, application update 328 may also be sent from enhancement controller 316 to web server 302 to update an online application in set of online applications 304.

In one embodiment, application controller 309 receives application update 328 from client 300. In this example, application controller 309 uses data in application update 328 to synchronize or update an online version of an offline application running on client 300. The online version of the offline application is an online application is set of online applications 304.

Client also includes memory 324. Memory 324 may be any type of non-volatile memory for storing set of offline applications 326. Memory 324 may also be a partition in memory dedicated to storing set of offline applications 326. Set of offline applications 326 may include one or more offline applications.

In the example shown in FIG. 3, when web browser 314 connects to web server 302 hosting a website that serves as a web 2.0 application associated with web server 302, application controller 309 and/or the web site itself, can elect to notify web browser 314 that an offline version of the web 2.0 application is available by sending notice 306. The user is then prompted with the information about offline application 312, such as the file size and feature set. Application controller 309 may also bring up a dialog box asking the user if the offline application should be installed if an older version of the offline application is found on the client and/or if no version of the offline application is found on the client. If the user elects to install offline application 312, web browser 314 sends an HTTPS request to the URI. Application controller 309 responds by sending a compressed archive to web browser 314. For example, application controller 309 could send a zip archive containing offline application 312.

Web browser 314 automatically installs offline application 312 in non-volatile storage, such as memory 324. For example, web browser 314 may install offline application 312 by temporarily expanding the compressed archive file and inspecting a well-known install-metadata.xml file. From the metadata file, web browser 314 may retrieve any necessary information to install offline application 312 to a local HTTP server. For instance, the metadata file may state that a PHP: Hypertext Preprocessor module must be loaded to the local HTTP server to the browser. Metadata extensible markup language (XML) file may also provide the path to the entry point to the application. For example, the path to the entry point may be ./MyFinanceApp/Main.htm.

When a network connection is not available, the user can access offline application 312 with a local uniform resource locator (URL). Offline application 312 can be as rich as today's desktop applications. In fact, users may elect to use the offline version of the application and only contact the web 2.0 application on web server 302 when the user wants to synchronize their online and offline versions of the application.

In this illustrative embodiment, client 300 is a device that supports a browser and has some local memory. Client 300 is not required to have an operating system because web browser 314 acts as an operating system or platform for executing offline applications. However, client 300 may include an operating system in another illustrative embodiment.

In this example, web browser 314 is a currently available browser with enhancement controller 316 added to web browser 314 and play the role of an operating system as a plug-in or extension to a current browser. However, in accordance with an illustrative embodiment, web browser 314 may also be a new web browser that incorporates enhancement controller 316 as an initial part of the web browser, rather than as a plug-in or extension.

In another embodiment, web browser 314 may be constructed using a Linux® box with a minimal kernel and Mozilla Firefox® in combination with enhancement controller 316 to implement the processes of the illustrative embodiments.

Figure 4:
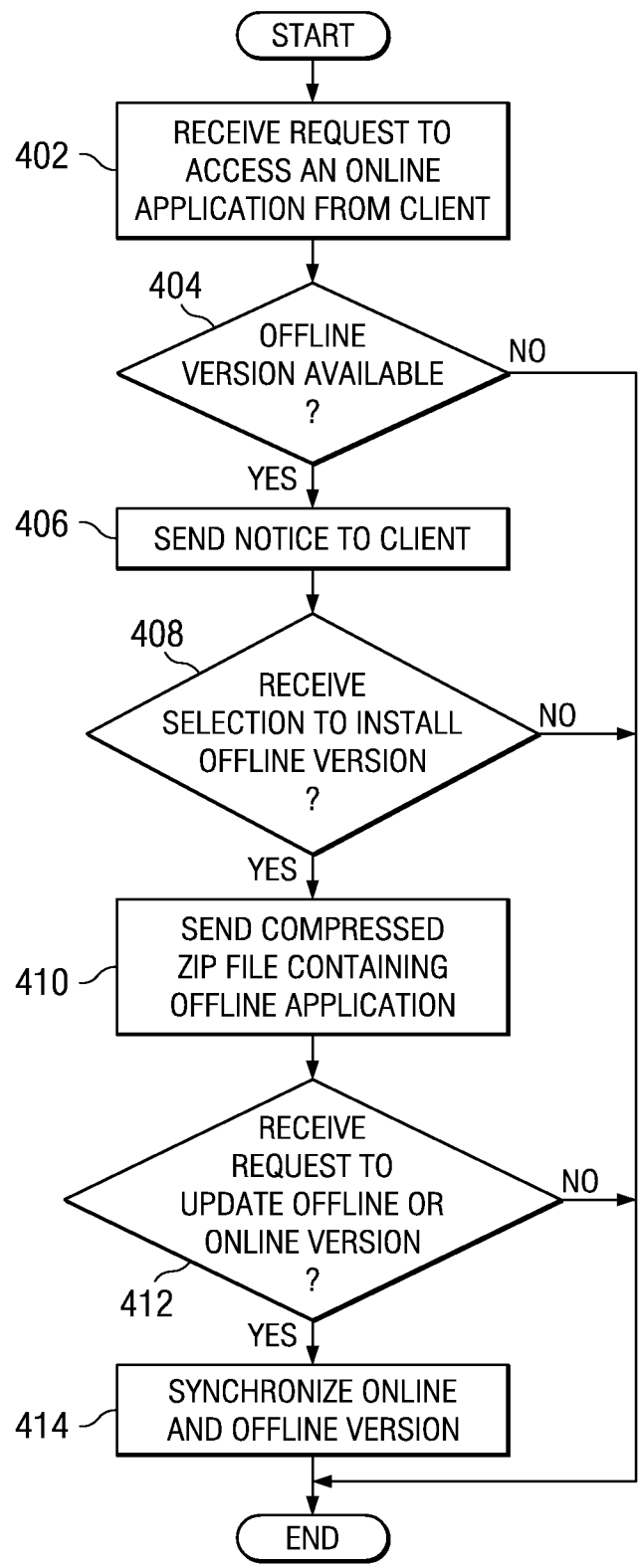
FIG. 4 is a flowchart illustrating a process for a server providing an updateable offline version of an online web-application to a client in accordance with an illustrative embodiment.

Turning now to FIG. 4, a flowchart illustrating a process for a server providing an updateable offline version of an online web-application to a client is shown in accordance with an illustrative embodiment. The process in FIG. 4 may be implemented by a software component for providing an offline version of an online application to a client. For example, the process may be implemented by application controller 309 in FIG. 3.

The process begins by receiving a request to access an online application from a client (step 402). The process makes a determination as to whether an offline version of the online application is available (step 404). If an offline version of the application is not available, the process terminates thereafter.

If an offline version of the application is available in step 404, the process sends a notice to the client that the offline version is available (step 406). The process makes a determination as to whether a selection to download and/or install the offline application is received from the client (step 408). If a selection to download and/or install an offline version is not received, the process terminates thereafter.

Returning to step 408, if a selection to download and/or install the offline application is received, the process sends a compressed zip file containing the offline application to the client (step 410). The process then makes a determination as to whether a request to update the offline version of the application with data from the online version of the application and/or a request to update the online version of the application with data from the offline version is received (step 412). If a request to update the online and/or offline version of the application is not received, the process terminates thereafter.

Returning to step 412, if a request to update the online and/or offline version was received, the process synchronizes the online and/or offline version of the application (step 414) with the process terminating thereafter. Synchronizing the online and/or offline version can be accomplished by sending an application update, such as application update 328 in FIG. 3.

Figure 5:
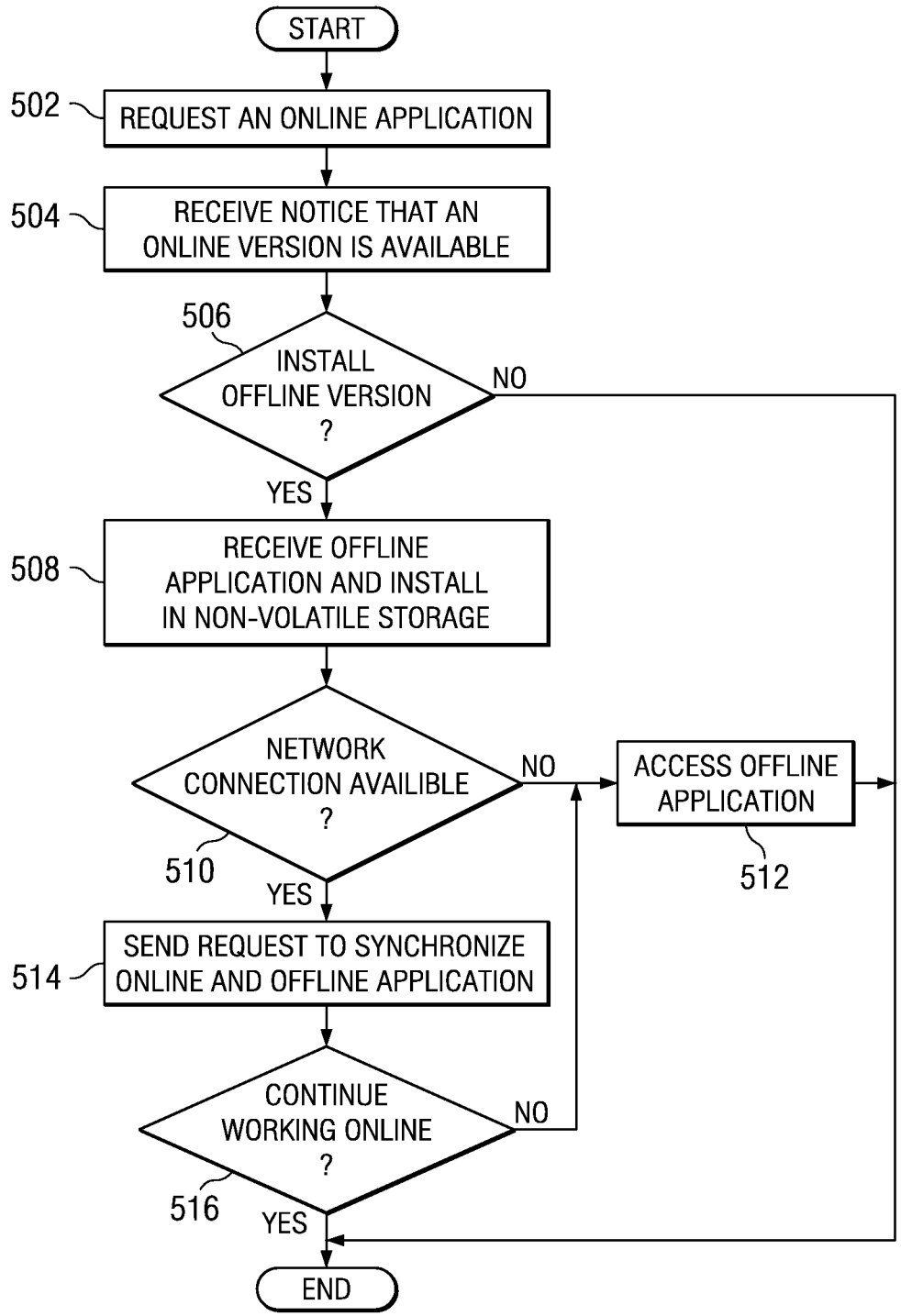
FIG. 5 is a flowchart illustrating a process for a client utilizing an updateable offline version of an online web-application in accordance with an illustrative embodiment.

FIG. 5 is a flowchart illustrating a process for a client utilizing an updateable offline version of an online web-application in accordance with an illustrative embodiment. The process in FIG. 5 may be implemented by a web browser having software plug-in to enable the web browser to act as a platform for execution of offline applications, such as enhancement controller 316 in FIG. 3.

The process begins by requesting an online application from a server, such as web server 302 in FIG. 3 (step 502). The process receives a notice from the server indicating that an offline version of the requested online application is available (step 504). The process makes a determination as to whether to install the offline version of the online application (step 506). If the offline application will not be installed, the process terminates thereafter.

Returning to step 506, if the offline application will be installed, the process receives the offline application from the server and installs the offline application in a non-volatile storage (step 508). The non-volatile storage may be any type of non-volatile memory location associated with the client, including but not limited to, a hard disk, a non-volatile random access memory (NV-RAM), main memory, or any other memory location.

Next, the process makes a determination as to whether a network connection is available (step 510). If a network connection is not available, the process accesses and/or executes the offline version of the application (step 512) with the process terminating thereafter.

Returning to step 510, if a network connection is available, the process sends a request to synchronize the online application with the offline application so that data in both the online and offline versions of the application will be consistent (step 514). Next, the process makes a determination as to whether to continue working online (step 516). If a decision is made to continue working online, the process terminates thereafter. However, if a determination is made to stop working online at step 516, the process sends a request to synchronize the offline version of the application with the online version of the application prior to terminating the online network connection with the process terminating thereafter.

There may be an instance where an online application needs to update the offline version of the application on the web browser appliance. For example, if a user uses a web 2.0 application to balance the user's monthly budget, the offline version of the budget application can be updated with the user's latest budget information. Thus, when a user works offline, the offline version will include the user's latest budget information, just as the online version would. Likewise, when the user finishes working in the offline version, the user may wish to ensure that the changes made to the budget during the online session are updated in the online version so that next time the user works in the online application, that information will also contain the latest budget information and changes made by the user.

When an online application has an update it wants to push to an offline version, the online application can initiate an application exchange by putting a well known flag in the HTTP pragma header of a message sent to the client. A pragma header is typically a compiler directive communicating additional information to the compiler.

Figure 6:
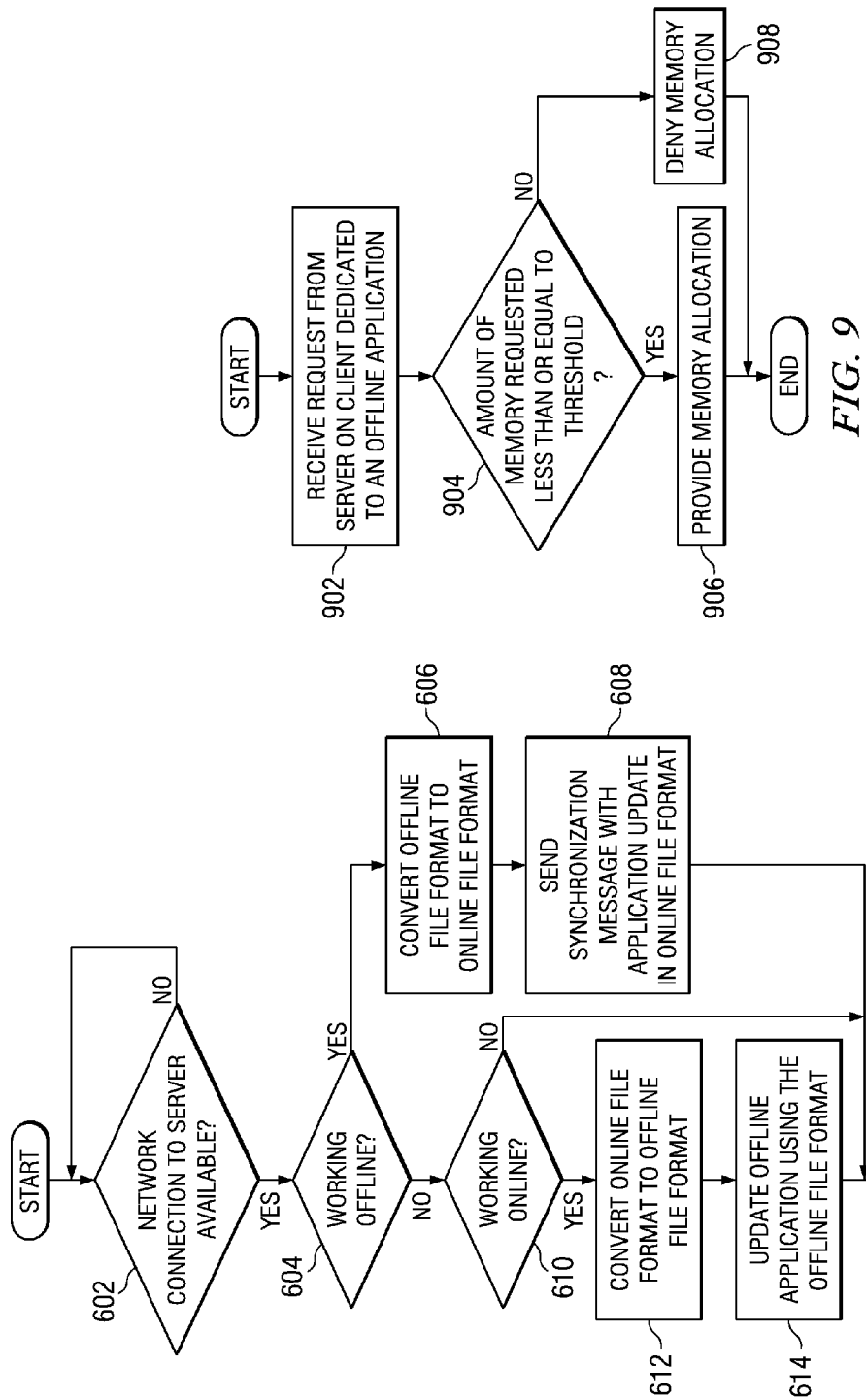
FIG. 6 is a flowchart illustrating a process for synchronizing an offline version of an application with an online version of the application in accordance with an illustrative embodiment.

Referring now to FIG. 6, a flowchart illustrating a process for synchronizing an offline version of an application with an online version of the application is depicted in accordance with an illustrative embodiment. The process in FIG. 6 is implemented by a browser having a software component for enabling the browser to execute an offline version of an online application in a runtime environment located on a client 300. For example, the process may be implemented by a browser, such as web browser 314 in FIG. 3.

The process begins by making a determination as to whether a network connection to a server hosting an online application is available (step 602). If a network connection is not available, the process returns to step 602. If a network connection is available, the process makes a determination as to whether a user is currently working offline (step 604). If the user is working offline, the process converts data in the offline application which is in an offline file format to an online file format (step 606). The process sends synchronization message with application update in the online file format to the server to update the online application (step 608) with the process terminating thereafter.

Returning to step 604, if a network connection is available and a user is not working offline, the process makes a determination as to whether the user is working online (step 610). If the user is not working online, the process terminates thereafter. Returning to step 610, if the user is working online, the process converts data in the online application in an online file format to an offline file format (step 612). The process then updates the offline application using the data in the offline file format (step 614) with the process terminating thereafter.

Figure 7:
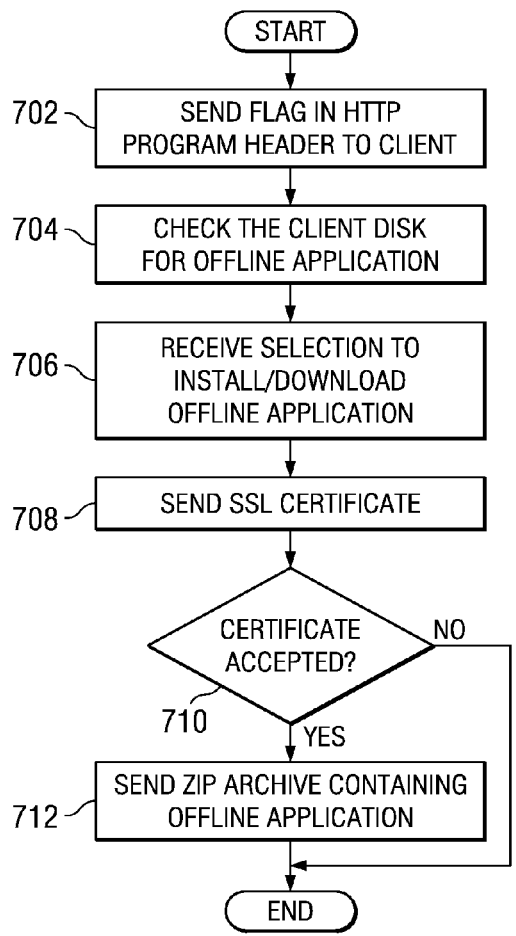
FIG. 7 is a flowchart illustrating a process for sending an offline application to a client in accordance with an illustrative embodiment.

FIG. 7 is a flowchart illustrating a process for sending an offline application to a client in accordance with an illustrative embodiment. The process in FIG. 7 may be implemented by a software component for providing an offline version of an online application to a client. For example, the process may be implemented by application controller 309 in FIG. 3.

The process begins by sending a flag in a hypertext transfer protocol (HTTP) pragma header with the version number of the application (step 702). The pragma general-header field is used to include implementation-specific directives. An HTTPS universal resource locator (URL) for the browser to download the application is also provided in the header. The URI includes the version number of the application in its URL.

The process checks a client disk for instances of the offline application (step 704). The process receives a selection to download and/or install the offline application from a client (step 706). The process responds by sending a secure sockets layer (SSL) certificate to be verified by the user and changes the HTTP content type to "application/x-zip" (step 708). The process makes a determination as to whether the certificate has been accepted by the client (step 710). If the certificate has not been accepted, the process terminates thereafter.

Returning to step 710, if the certificate has been accepted by the client, the process sends a zip archive containing the offline application to the client (step 712) with the process terminating thereafter.

Figure 8:
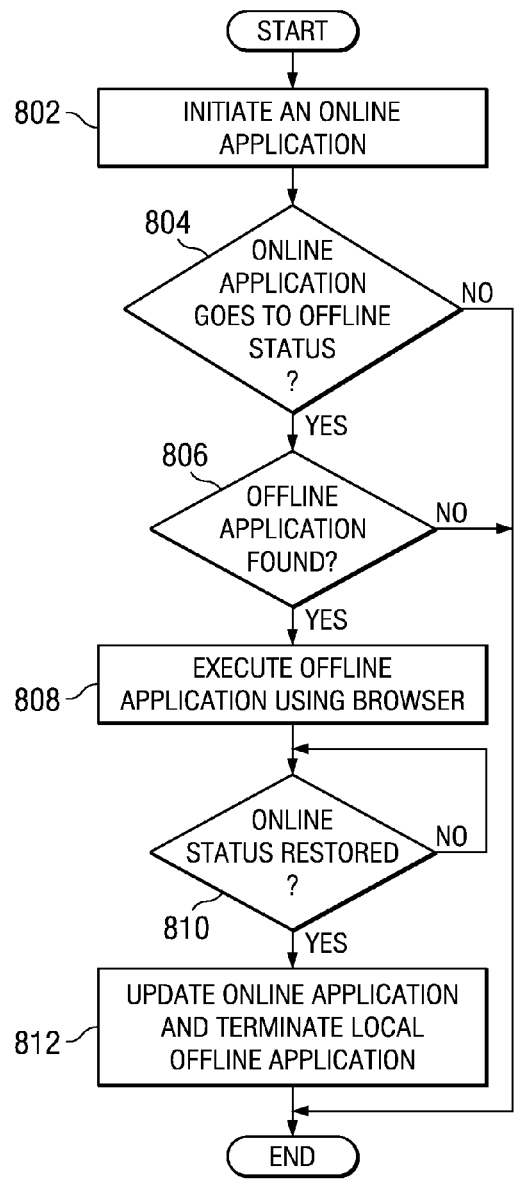
FIG. 8 is a flowchart illustrating a process for executing an offline application in a client browser in accordance with an illustrative embodiment.

Turning now to FIG. 8, a flowchart illustrating a process for executing an offline application in a client browser in accordance with an illustrative embodiment. The process in FIG. 8 may be implemented by a software component for executing a native application supportive of an online application in response to the online application going to an offline status. For example, the process may be implemented by enhancement controller 316 in FIG. 3.

The process begins by initiating an online application (step 802). The process makes a determination as to whether the online application goes to an offline status (step 804). In other words, the process determines if a connection to the network is lost. If the online application does not go to an offline status, the process terminates thereafter.

Returning to step 804, if the online application does go to an offline status, the process makes a determination as to whether an offline version of the application is available locally on the client (step 806). If an offline version of the application is not available, the process terminates thereafter. However, if an offline version of the application is available at step 806, the process executes the offline application using a web browser as a platform (step 808).

The process makes a determination as to whether the online status is restored (step 810). In other words, the process determines if the network connection to the server providing the online version of the application can be re-established. If the online status has not been restored, the process returns to step 810 until the online status is restored. When the online status is restored at step 810, the process updates the online application with data from the offline version of the application and terminates execution of the local offline application (step 812) with the process terminating thereafter.

In another illustrative embodiment, space may be allocated on a client for use by a website. The allocated memory space is space the web site or online application manages itself. For example, if a website "CoolWebSite" wants to install a light offline version of its online application onto a user's computer, "CoolWebSite" would request space on the user's computer. "CoolWebSite" could request space by displaying a dialog box to the user requesting allocation of the memory space.

In another embodiment, if the web site is a known and trusted web site, and the request for memory is below a threshold amount of memory, the client computer could automatically allocate the requested space. Once the web site has the space allocated in memory for the offline application, the web site is free to manage the space in any manner it desires.

For example, the web site can update the installed offline application whenever necessary without requesting permission from the user. If the website needs more space, the web site can request additional allocation of space. The advantage of this approach is that the user will only be harassed once for installation of the offline application. After that, everything regarding the offline application installation, maintenance and updates are performed automatically.

FIG. 9 is a flowchart illustrating a process for providing a dedicated memory space for an offline application in accordance with an illustrative embodiment. The process in FIG. 9 may be implemented by a web browser, such as web browser 314 in FIG. 3.

The process begins by receiving a request from a server providing an offline version of an online application for space on the client to dedicate to the offline application (step 902). The process makes a determination as to whether the amount of memory requested is less than or equal to a threshold amount (step 904). If the amount of memory requested is less than or equal to the threshold, the process allocates the amount of memory requested by the server to form a dedicated memory space for the offline application (step 906) with the process terminating thereafter. The dedicated memory space may be a partition in a hard disk, or any other portion of memory.

If the requested amount of memory is not less than or equal to the threshold at step 904, the process denies the memory allocation request (step 908) with the process terminating thereafter.

The illustrative embodiments provide a computer implemented method, apparatus, and computer usable program code for providing an offline version of an online application.

In one embodiment, the process initiates an online application on a connected client device using a specific operating environment associated with the online application. In response to detecting the online application going to an offline status, a determination is made as to whether a native application on the client device is present that is supportive of the online application. In response to a determination that the native application is present, the native application is executed using the specific operating environment associated with the online application. The specific operating environment is transferred from the operating environment of the online application on a server to the native application on the client.

In another embodiment, an online application is initiated by a client computing device to perform a task. In response to detecting the online application going to an offline status, an offline application associated with the client computing device that is supportive of the online application is identified. The offline application is executed on the client computing device to complete performance of the task.

The online application may be executed in a runtime environment on a server. The offline application is executed in a runtime environment associated with a web browser on the client computing device in the absence of a network connection. An offline status may indicate a failure in a network connection, a server running the online application has become unresponsive, or an application has crashed.

In this manner, a user may continue to work and utilize services provided by an online application even after a connection to the server hosting the online application is terminated, the online application crashes, and/or any other event occurs which renders an online application unavailable for performing a task.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for providing an offline version of an online application, the computer implemented method comprising:

initiating the online application on a connected client device using a specific operating environment associated with the online application, wherein initiating is performed by a tangible processor;

responsive to detecting the online application going to an offline status, determining whether a native application on the client device is present that is supportive of the online application;

responsive to a determination that the native application is present, executing the native application using the specific operating environment associated with the online application, wherein the specific operating environment is transferred from the operating environment associated with the online application on a server to an environment associated with the native application on the client; and allocating a memory space on the client device to the online application, wherein the native application is stored in the memory space, and wherein the offline version of the online application is automatically updated in the memory space without requiring prior approval from a user.

2. The computer implemented method of claim 1 further comprising:

responsive to restoring an online status, terminating the native application and transferring the specific operating environment associated with the native application to the specific operating environment associated with the online application.

3. The computer implemented method of claim 1 wherein the offline version of the online application is selected from the group consisting of a word processor application, a spreadsheet application, a drawing program, an editing program, a game, and a media player.

4. The computer implemented method of claim 1 wherein the specific operating environment includes user generated data associated with either the online application or the offline version of the online application.

5. The computer implemented method of claim 1 wherein the offline status indicates a network failure, wherein the network failure is selected from the group consisting of a failure in a network connection, the server running the online application is unresponsive, and the online application terminated unexpectedly.

6. An apparatus comprising:

a bus system;

a communications system connected to the bus system;

a memory connected to the bus system, wherein the memory includes computer usable program code; and a processing unit connected to the bus system, wherein the processing unit is configured to execute the computer usable program code to initiate an online application on a connected client device using a specific operating environment associated with the online application; determine whether a native application on the client device is present that is supportive of the online application in response to detecting the online application going to an offline status; and execute the native application using the specific operating environment associated with the online application in response to a determination that the native application is present, wherein the specific operating environment is transferred from the operating environment associated with the online application on a server to an environment associated with the native application on the client, and wherein the processing unit further is configured to execute the computer usable program code to allocate a memory space on the client device to the online application, wherein the native application is stored in the memory space, and wherein the offline version of the online application is automatically updated in the memory space without requiring prior approval from a user.

7. The apparatus of claim 6 wherein the online application is executed in a runtime environment on a server.

8. The apparatus of claim 6 wherein the offline version of the online application is executed in a runtime environment associated with a web browser on the client computing device, and wherein the offline version of the online application is a browser plug-in that executes in an absence of a network connection.

9. The apparatus of claim 6 wherein the offline status indicates at least one of a failure in a network connection, a server running the online application has become unresponsive, and the online application has terminated unexpectedly.

10. A non-transitory tangible computer readable storage medium storing computer usable program code for providing an offline version of an online application, the computer usable program code comprising:

computer usable program code for initiating the online application on a connected client device using a specific operating environment associated with the online application, wherein initiating is performed by a tangible processor;

computer usable program code for, responsive to detecting the online application going to an offline status, determining whether a native application on the client device is present that is supportive of the online application;

computer usable program code for, responsive to a determination that the native application is present, executing the native application using the specific operating environment associated with the online application, wherein the specific operating environment is transferred from the operating environment associated with the online application on a server to an environment associated with the native application on the client; and computer usable program code for allocating a memory space on the client device to the online application, wherein the native application is stored in the memory space, and wherein the offline version of the online application is automatically updated in the memory space without requiring prior approval from a user.

11. The non-transitory tangible computer readable storage medium of claim 10, wherein the computer usable program code further comprises:

computer usable program code for, responsive to restoring an online status, terminating the native application and transferring the specific operating environment associated with the native application to the specific environment associated with the online application.

12. The non-transitory tangible computer readable storage medium of claim 10, wherein the offline version of the online application is selected from the group consisting of a word processor application, a spreadsheet application, a drawing program, an editing program, a game, and a media player.

13. The non-transitory tangible computer readable storage medium of claim 10, wherein the specific operating environment includes user generated data associated with either the online or offline application.

14. The non-transitory tangible computer readable storage medium of claim 10, wherein the offline status indicates a network failure, wherein the network failure is selected from a group consisting of a failure in a network connection, the server running the online application is unresponsive, and the online application terminated unexpectedly.

* * * * *